(12) United States Patent
Zhou et al.

(10) Patent No.: US 8,884,482 B2
(45) Date of Patent: Nov. 11, 2014

(54) CENTRIFUGAL SWITCH ACTUATOR AND MOTOR COMPRISING THE SAME

(75) Inventors: Boran Zhou, Changzhou (CN); Shuangjun Liu, Changzhou (CN); Jianming Lu, Changzhou (CN)

(73) Assignee: Changzhou Xinya Electromotor Co., Ltd., Changzhou (CN)

( * ) Notice: Subject to any disclaimer, the term of this patent is extended or adjusted under 35 U.S.C. 154(b) by 346 days.

(21) Appl. No.: 13/488,411

(22) Filed: Jun. 4, 2012

(65) Prior Publication Data

US 2012/0280584 A1 Nov. 8, 2012

Related U.S. Application Data

(63) Continuation-in-part of application No. PCT/CN2011/074665, filed on May 27, 2011.

(30) Foreign Application Priority Data

May 3, 2011 (CN) .......................... 2011 1 0111950

(51) Int. Cl.
*H02K 11/00* (2006.01)
(52) U.S. Cl.
USPC ....................................... 310/68 E; 200/80 R
(58) Field of Classification Search
CPC ..................... H02K 11/0036; H01H 35/10
USPC ..................... 200/80 R; 310/71, 68 E, 68 C
See application file for complete search history.

(56) References Cited

U.S. PATENT DOCUMENTS

| 4,315,118 | A | * | 2/1982 | Kramer et al. | 200/80 R |
|---|---|---|---|---|---|
| 4,359,617 | A | * | 11/1982 | Silhouette | 200/80 R |
| 5,664,666 | A | * | 9/1997 | Filla | 200/246 |
| 5,744,883 | A | * | 4/1998 | Lewis et al. | 310/68 E |
| 6,710,271 | B2 | * | 3/2004 | Spedale et al. | 200/80 R |
| 6,982,507 | B2 | * | 1/2006 | Lin | 310/68 E |
| 8,362,663 | B2 | * | 1/2013 | Chen et al. | 310/68 C |
| 8,415,576 | B2 | * | 4/2013 | Lu | 200/80 R |

* cited by examiner

*Primary Examiner* — Hanh Nguyen
(74) *Attorney, Agent, or Firm* — Matthias Scholl P.C.; Matthias Scholl (57) ABSTRACT

A centrifugal switch actuator including a junction box, a cover, a first static and dynamic contact combination, a second static and dynamic contact combination, an outer swing arm, an inner swing arm, and a reset elastic element. The first static and dynamic contact combination, the second static and dynamic contact combination, and the reset elastic element are located in the junction box. The outer swing arm includes a first outer swing arm and a second outer swing arm. The inner swing arm includes a first inner swing arm and a second inner swing arm. The length of the first static and dynamic contact combination is different from that of the second static and dynamic contact combination.

20 Claims, 9 Drawing Sheets

CENTRIFUGAL SWITCH ACTUATOR AND MOTOR COMPRISING THE SAME

CROSS-REFERENCE TO RELATED APPLICATIONS

This application is a continuation-in-part of International Patent Application No. PCT/CN2011/074665 with an international filing date of May 27, 2011, designating the United States, now pending, and further claims priority benefits to Chinese Patent Application No. 201110111950.8 filed May 3, 2011. The contents of all of the aforementioned applications, including any intervening amendments thereto, are incorporated herein by reference.

BACKGROUND OF THE INVENTION

1. Field of the Invention

The invention relates to a centrifugal switch actuator and a motor comprising the same.

2. Description of the Related Art

Centrifugal switches are widely used in many circumstances, especially motors. A motor equipped with a centrifugal switch mainly includes a stator with a primary coil and an auxiliary coil, a rotor, a rotating shaft integrated with the rotor, endshields for supporting the motor body and preventing shock/static electricity, and a centrifugal switch fixed on the rotating shaft. The centrifugal switch is mainly composed of a centrifugal switch body and a centrifugal switch actuator. When the rotor reaches a certain speed, i.e. 70-80% of the startup speed, a centrifugal block of the centrifugal switch body that is mounted on the rotating shaft overcomes the spring resistance to allow a slide plate of the centrifugal switch body to move in the axial or radial direction. The slide plate moves to drive the centrifugal switch actuator to cut off the power supply of the auxiliary coil. The centrifugal switch actuator mainly includes a junction box, a cover, a static contact, a dynamic contact, a reset elastic element, and swing arms, in which the static contact and the dynamic contact are located in the junction box. The swing arms include an outer swing arm outside the junction box and an inner swing arm inside the junction box. The joint between the outer swing arm and the inner swing arm is hinged on the junction box. The inner swing arm is used to push the dynamic contact to open or close the static contact and the dynamic contact while the outer swing arm is used to cooperate with the slide plate of the centrifugal switch body.

The working principle of a motor including the centrifugal switch is as follows: under normal circumstances, the rotor runs at a permissible speed and the slide plate of the centrifugal switch body is against the outer swing arm. When the rotor runs beyond the permissible speed, i.e. 70-80% of the startup speed, the centrifugal block of the centrifugal switch body overcomes the spring resistance to expand outwards to allow the slide plate to move. The outer swing arms then lose the acting force imposed by the slide plate and the reset elastic element enables the swing arms to reset automatically so as to achieve the movement of the dynamic contact under the push of the inner swing arm.

Figure 2:
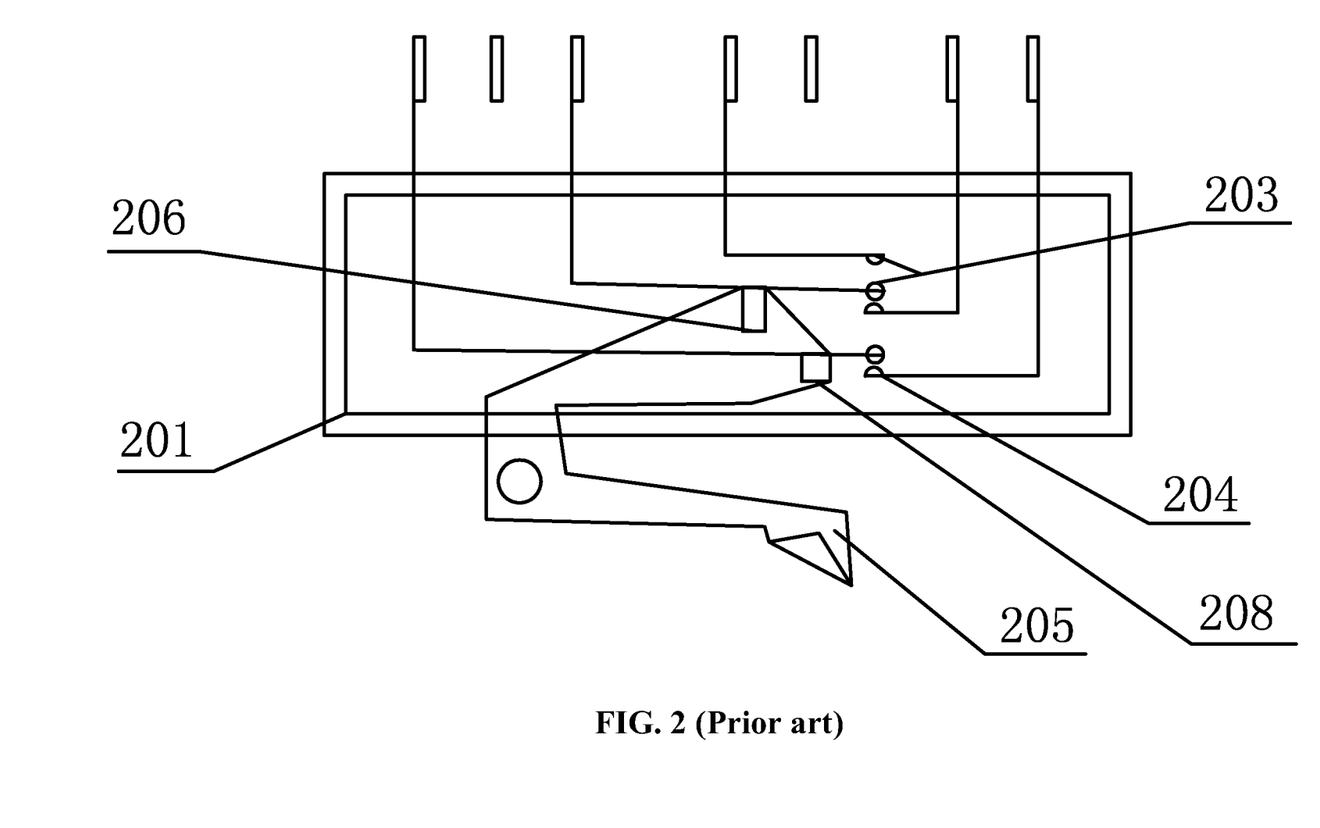
FIG. 2 is an internal structural representation of a centrifugal switch actuator disclosed in the prior art.
Figure 3:
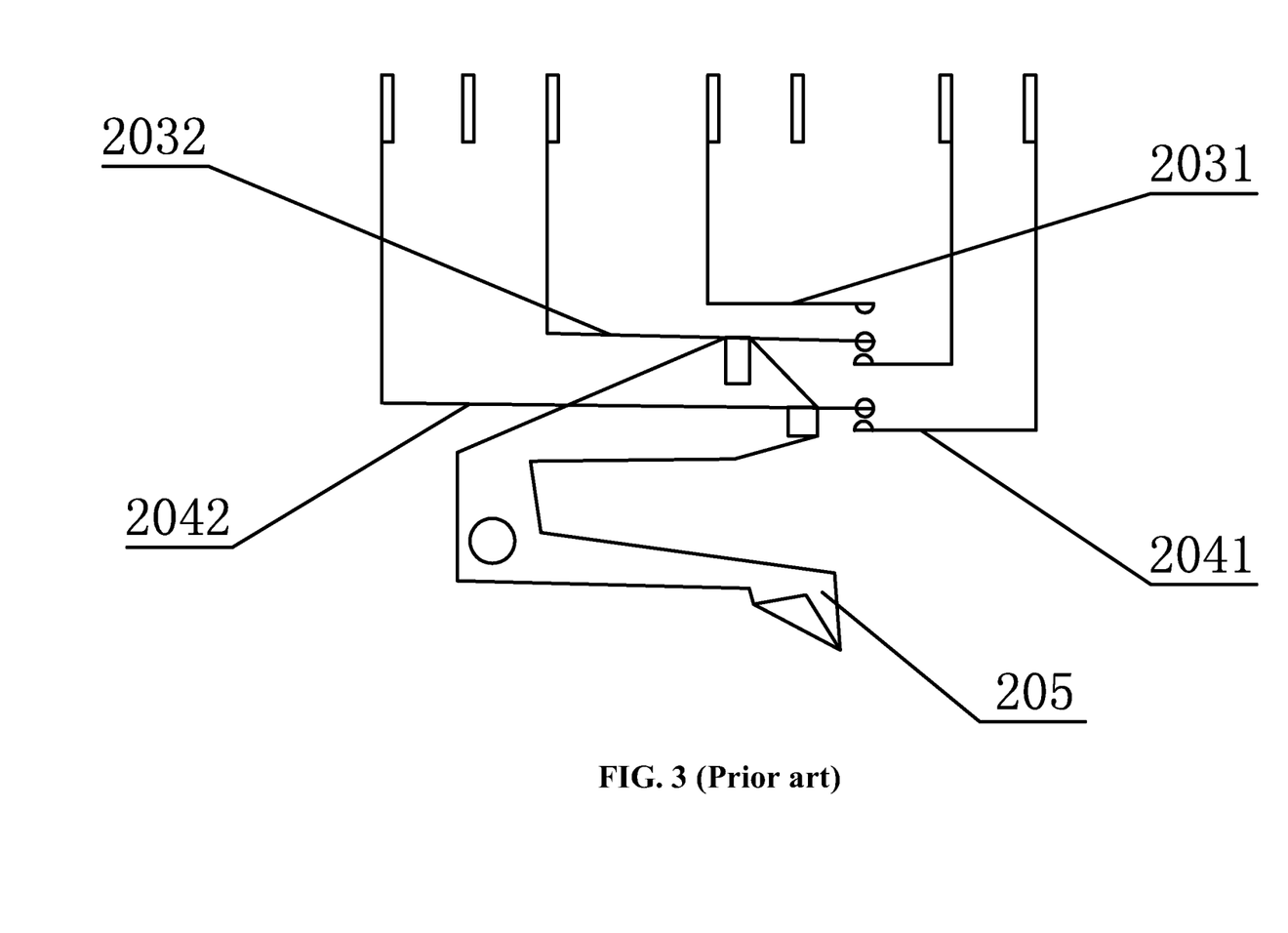
FIG. 3 is an internal partial structural representation of a centrifugal switch actuator disclosed in the prior art.

Conventionally, a centrifugal switch actuator has two types of structures: one is that the centrifugal switch actuator, as shown in FIGS. 2 and 3, includes an outer swing arm 205 disposed outside a junction box 201 and two inner swing arms disposed inside the junction box 201, i.e. a first inner swing arm 206 and a second inner swing arm 208. The outer swing arm 205 singly controls both the first inner swing arm 206 and the second inner swing arm 208 simultaneously. The centrifugal switch actuator also includes different length of static and dynamic contact combinations that are parallel with each other in two lines, i.e. a first static and dynamic contact combination 203 and a second static and dynamic contact combination 204. The first static and dynamic contact combination 203 includes a first static contact 2031 and a first dynamic contact 2032 while the second static and dynamic contact combination 204 includes a second static contact 2041 and a second dynamic contact 2042. The first inner swing arm 206 pushes the first dynamic contact 2032 to close or open the first static and dynamic contact combination 203 while the second inner swing arm 208 pushes the second dynamic contact 2042 to close or open the second static and dynamic contact combination 204 so as to finally connect or disconnect the power supply of the motor's auxiliary coil. Since a single outer swing arm is used to control two inner swing arms, the structure of the swing arms is complicated and the requirements for parts machining precision and mounting accuracy are high, or otherwise false operation or malfunction may occur; therefore, the manufacturing costs are high.

Figure 4:
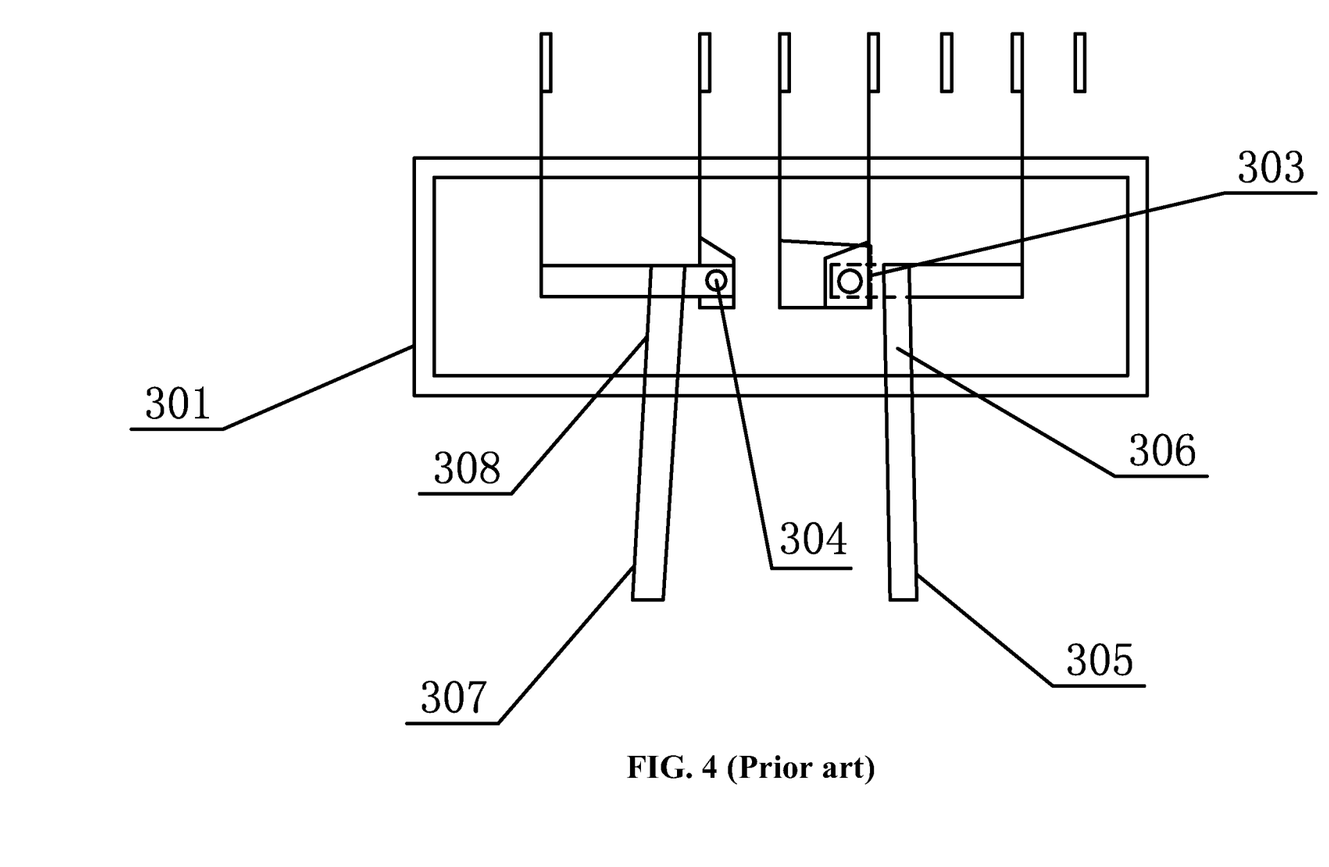
FIG. 4 is an internal structural representation of another centrifugal switch actuator disclosed in the prior art.
Figure 5:
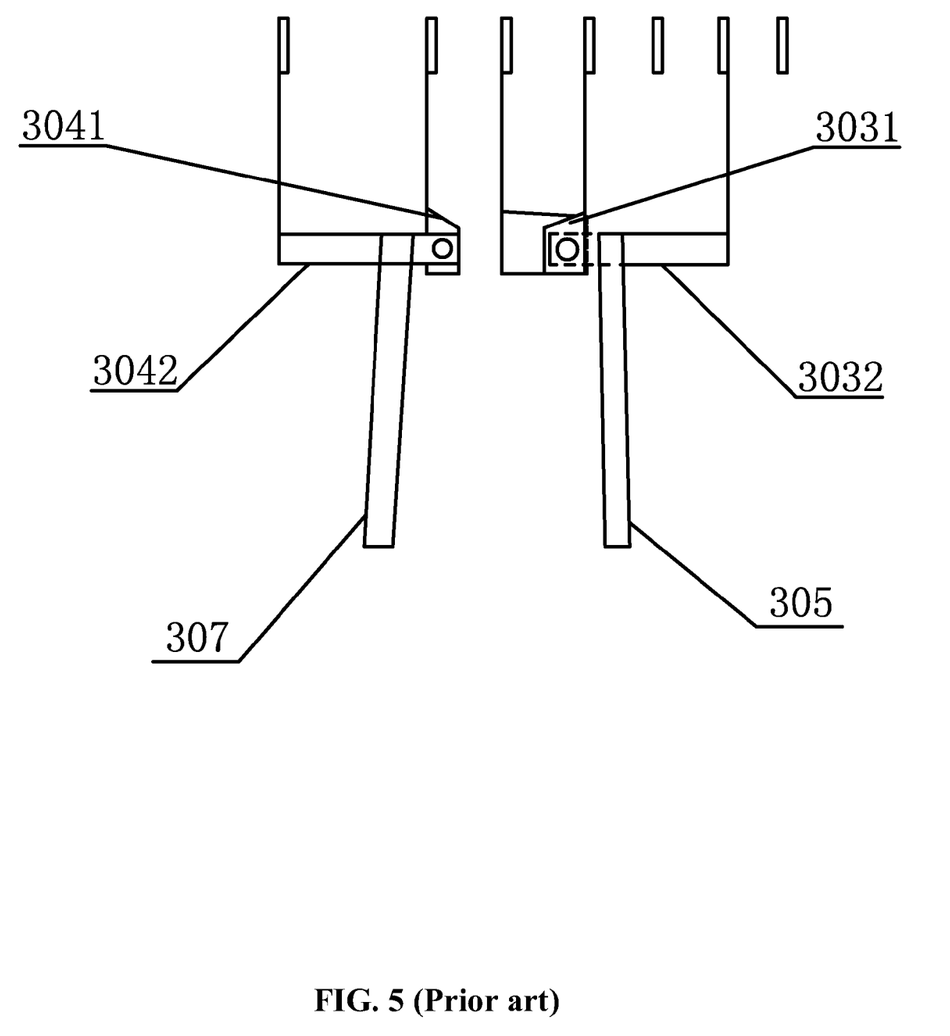
FIG. 5 is an internal partial structural representation of another centrifugal switch actuator disclosed in the prior art.

Another type of centrifugal switch actuator, as shown in FIGS. 4 and 5, includes two swing arms, i.e. a first swing arm and a second swing arm. The first swing arm includes a first outer swing arm 305 outside the junction box 301 and a first inner swing arm 306 inside the junction box 301 while the second swing arm includes a second outer swing arm 307 outside the junction box 301 and a second inner swing arm 308 inside the junction box 301. The centrifugal switch actuator also includes the same length of static and dynamic contact combinations that are parallel with each other in two rows, i.e. a first static and dynamic contact combination 303 and a second static and dynamic contact combination 304. The first static and dynamic contact combination 303 includes a first static contact 3031 and a first dynamic contact 3032 while the second static and dynamic contact combination 304 includes a second static contact 3041 and a second dynamic contact 3042. The first inner swing arm 306 pushes the first dynamic contact 3032 to close or open the first static and dynamic contact combination 303 so as to finally connect or disconnect the power supply of the motor's auxiliary coil. The second inner swing arm 308 pushes the second dynamic contact 3042 to open or close the second static and dynamic contact combination 304 so as to finally disconnect or connect the power supply of the heating elements. This type of centrifugal switch actuator is likely to produce momentary high current and the safety thereof is poorer than that shown in FIGS. 2 and 3.

The reason why the safety of the centrifugal switch actuator shown in FIGS. 4 and 5 is poorer than that shown in FIGS. 2 and 3 is that the centrifugal switch actuator shown in FIGS. 4 and 5 has the same length of the first and second static and dynamic contact combinations, i.e. the length ratio is 1:1 and the length is relatively short. When the motor runs beyond the permissible speed, i.e. 70-80% of the startup speed, the centrifugal block of the centrifugal switch body overcomes the spring resistance to expand outwards to allow the slide plate to move. The outer swing arms then lose the acting force imposed by the slide plate and the reset elastic element enables the first and second swing arms to reset automatically. The momentary high current is likely to be produced when the first inner swing arm pushes the first dynamic contact to open the first static and dynamic contact combination while the second swing arm pushes the second dynamic contact to close the second static and dynamic contact combination; therefore the motor safety will be affected and the potential safety hazard exists. As shown in FIGS. 2 and 3, the length of the first static and dynamic contact combination 203 of the centrifugal switch actuator is smaller than that of the second static and dynamic contact combination 204, i.e. the length ratios is within the range of 1:1.5-1:2; therefore at the moment when the static and dynamic contact combinations move, i.e. the first static and dynamic contact combination is open while the second static and dynamic contact combination is close, the momentary high current is prevented.

SUMMARY OF THE INVENTION

In view of the above-described problems, it is one objective of the invention to provide a centrifugal switch actuator that has a lower requirement for parts machining precision and mounting accuracy, low production cost, high working accuracy/reliability, long service life, and can prevent false operation or malfunction and momentary high current.

To achieve the above objective, in accordance with one embodiment of the invention, there is provided a centrifugal switch actuator comprising a junction box, a cover, a first static and dynamic contact combination, a second static and dynamic contact combination, an outer swing arm, an inner swing arm, and a reset elastic element, wherein the first static and dynamic contact combination, the second static and dynamic contact combination, and the reset elastic element are located in the junction box, the joint between the outer swing arm and the inner swing arm is hinged on the junction box, and the reset elastic element enables the out swing arm and the inner swing arm to reset automatically. The outer swing arm comprises a first outer swing arm and a second outer swing arm; the inner swing arm comprises a first inner swing arm and a second inner swing arm. The joint between the first outer swing arm and the first inner swing arm as well as the joint between the second outer swing arm and the second inner swing arm are hinged on the junction box, respectively. The length of the first static and dynamic contact combination is different from that of the second static and dynamic contact combination.

In a class of this embodiment, the first static and dynamic contact combination and the second static and dynamic contact combination are parallel with each other in two lines and the length of the first static and dynamic contact combination is smaller than that of the second static and dynamic contact combination.

In a class of this embodiment, the length ratio between the first static and dynamic contact combination and the second static and dynamic contact combination is within the range of 1:1.2-1:3.

In a class of this embodiment, the first static and dynamic contact combination comprises a first static contact and a first dynamic contact, the second static and dynamic contact combination comprises a second static contact and a second dynamic contact, and the length of the first static contact is different from that of the second static contact.

In a class of this embodiment, the length of the first static contact is smaller than that of the second static contact.

In a class of this embodiment, the length ratio between the first static contact and the second static contact is within the range of 1:1.2-1:3.

In a class of this embodiment, the length ratio between the first static contact and the first dynamic contact is within the range of 1:1.2-1:2 and the length ratio between the second static contact and the second dynamic contact is within the range of 1:1-1:1.5.

In a class of this embodiment, the length ratio between the first inner swing arm and the second inner swing arm is within the range of 1:1.2-1:3.

With respect to the centrifugal switch actuator provided by the invention and that shown in FIGS. 2 and 3, their first static and dynamic contact combinations and second static and dynamic contact combinations are different in length. Although the problem of the momentary high current is prevented, the centrifugal switch actuator shown in FIGS. 2 and 3 has the long dynamic contact and short static contact, i.e. the length ratio between the first static contact and the first dynamic contact is within the range of 1:2-1:5 and the length ratio between the second static contact and the second dynamic contact is within the range of 1:2.5-1:6, resulting in that the dynamic contact cannot be pushed flexibly and working accurately. Whereas, in the invention, the static contact is long while the dynamic contact is short, so that the dynamic contact can be pushed flexibly and working accurately.

In accordance with another embodiment of the invention, there provided is a motor comprising a stator with a primary coil and an auxiliary coil, a rotor, a rotating shaft integrated with the rotor, a front endshield, a rear endshield, and a centrifugal switch fixed on the rotating shaft, wherein the front endshield and the rear endshield are connected together to form a cavity and the stator and the rotor are located in the cavity. The centrifugal switch comprises a centrifugal switch body and a centrifugal switch actuator. The centrifugal switch actuator comprises a junction box, a cover, a first static and dynamic contact combination, a second static and dynamic contact combination, an outer swing arm, an inner swing arm, a reset elastic element. The first static and dynamic contact combination, the second static and dynamic contact combination, and the reset elastic element are located in the junction box, the joint between the outer swing arm and the inner swing arm is hinged on the junction box, and the reset elastic element enables the out swing arm and the inner swing arm to reset automatically. The outer swing arm comprises a first outer swing arm and a second outer swing arm and the inner swing arm comprises a first inner swing arm and a second inner swing arm. The joint between the first outer swing arm and the first inner swing arm as well as the joint between the second outer swing arm and the second inner swing arm are hinged on the junction box, respectively. The length ratio between the first static and dynamic contact combination and the second static and dynamic contact combination is within the range of 1:1.2-1:3.

In a class of this embodiment, the first static and dynamic contact combination comprises a first static contact and a first dynamic contact and the second static and dynamic contact combination comprises a second static contact and a second dynamic contact, and the length ratio between the first static contact and the second static contact is within the range of 1:1.2-1:3.

In a class of this embodiment, the length ratio between the first static contact and the first dynamic contact is within the range of 1:1.2-1:2 and the length ratio between the second static contact and the second dynamic contact is within the range of 1:1-1:1.5.

In a class of this embodiment, the rear endshield comprises a rear endshield body, on which a boss is disposed. The boss and the rear endshield body are molded together by cast aluminum. The boss may be in any shape of a square, a circle, an oval, an arc, or a polygon.

When the motor runs at a permissible speed or the motor is out of service, the slide plate of the centrifugal switch body is against the outer swing arm, which is always under the acting force of the slide plate. In order to support and locate the outer swing arm and prevent it from being damaged under the long-term acting force of the slide plate, a boss is commonly disposed inside the rear endshield body according to the prior art. However, in the prior art, the boss directly contacts with the outer swing arm to support and locate it and is fixed inside the rear endshield body by means of connecting pieces, i.e. the boss and the rear endshield body are separated from each other. The boss in such a structure is required to be not only manufactured or processed separately but mounted to the rear endshield body by the connecting pieces, leading to more working procedures, high costs and a less compact structure. If the boss is disposed inside the rear endshield body, they are molded together by cast aluminum without leaving a gap in between. Compared with the separate structure used in the prior art, the above structure has the advantages that the boss can support and locate the outer swing arm and it is not required to be manufactured separately; therefore less working procedures are required and the compact structure is achieved. Consequently, it is a preferred technical solution of the invention to have the boss disposed inside the rear endshield body of the motor.

Comparison Between the Centrifugal Switch Actuator Provided by the Invention and that Disclosed in the Prior Art

| | | Prior Art 1 | Prior Art 1 | The Invention |
|---|---|---|---|---|
| Partial technical solution | Swing arms | Comprise an outer swing arm and two inner swing arms. The outer swing arm controls the two inner swing arms simultaneously. | Comprises a first swing arm and a second swing arm. The first swing arm comprises a first outer swing arm and a first inner swing arm, and the second swing arm comprises a second outer swing arm and a second inner swing arm. | Comprises a first swing arm and a second swing arm. The first swing arm comprises a first outer swing arm and a first inner swing arm, and the second swing arm comprises a second outer swing arm and a second inner swing arm. |
| | Static and dynamic contact combinations | The length ratio between the first and the second static and dynamic contact combination is within the range of 1:1.5-1:2. | The length ratio between the first and the second static and dynamic contact combination is within the range of 1:1. | The length ratio between the first and the second static and dynamic contact combination is within the range of 1:1.2-1:3. |
| | Length ratio between first and second static contacts | The length ratio between the first and the second static contacts is 1:1. | The length ratio between the first and the second static contacts is 1:1. | The length ratio between the first and the second static contacts is 1:1.2-1:3. |
| | Length ratio between static contact and dynamic contact | The length ratio between the first static contact and the second dynamic contact is within the range of 1:2-1:5 and the length ratio between the second static contact and the second dynamic contact is within the range of 1:2.5-1:6. | The length ratio between the first static contact and the second dynamic contact is within the range of 1:3-1:5 and the length ratio between the second static contact and the second dynamic contact is within the range of 1:3-1:6. | The length ratio between the first static contact and the second dynamic contact is within the range of 1:1.2-1:2 and the length ratio between the second static contact and the second dynamic contact is within the range of 1:1-1:1.5. |
| Parts machining precision and mounting accuracy | | High | Low | Low |
| Whether momentary high current is produced when the centrifugal switch actuator acts? | | No | Yes | No |
| Safety | | High | Low | High |
| Working accuracy | | Low | Average | High |
| Service life | | Short | Short | Long |

Comparison Between the Motor Comprising the Centrifugal Switch Actuator Provided by the Invention and that Disclosed in the Prior Art

| | | Prior Art 1 | Prior Art 1 | The Invention |
|---|---|---|---|---|
| Partial technical solution | Swing arms | Comprise an outer swing arm and two inner swing arms. The outer swing arm controls the two inner swing arms simultaneously. | Comprises a first swing arm and a second swing arm. The first swing arm comprises a first outer swing arm and a first inner swing arm, and the second swing arm comprises a second | Comprises a first swing arm and a second swing arm. The first swing arm comprises a first outer swing arm and a first inner swing arm, and the second swing arm comprises a second |

-continued

|  | Prior Art 1 | Prior Art 1 | The Invention |
|---|---|---|---|
|  |  | outer swing arm and a second inner swing arm. | outer swing arm and a second inner swing arm. |
| Static and dynamic contact combinations | The length ratio between the first and the second static and dynamic contact combination is within the range of 1:1.5-1:2. | The length ratio between the first and the second static and dynamic contact combination is within the range of 1:1. | The length ratio between the first and the second static and dynamic contact combination is within the range of 1:1.2-1:3. |
| Length ratio between first and second static contacts | The length ratio between the first and the second static contacts is 1:1. | The length ratio between the first and the second static contacts is 1:1. | The length ratio between the first and the second static contacts is 1:1.2-1:3. |
| Length ratio between static contact and dynamic contact | The length ratio between the first static contact and the second dynamic contact is within the range of 1:2-1:5 and the length ratio between the second static contact and the second dynamic contact is within the range of 1:2.5-1:6. | The length ratio between the first static contact and the second dynamic contact is within the range of 1:3-1:5 and the length ratio between the second static contact and the second dynamic contact is within the range of 1:3-1:6. | The length ratio between the first static contact and the second dynamic contact is within the range of 1:1.2-1:2, and the length ratio between the second static contact and the second dynamic contact is within the range of 1:1-1:1.5. |
| Parts machining precision and mounting accuracy | High | Low | Low |
| Whether momentary high current is produced when the centrifugal switch actuator acts? | No | Yes | No |
| Safety | High | Low | High |
| Working accuracy | Low | Average | High |
| Service life | Short | Short | Long |

Advantages of the invention are summarized below: the centrifugal switch actuator provided by the invention is designed with a single outer swing arm connecting to a single inner swing arm, which ensures that the low requirements of parts machining precision and mounting accuracy are met, false operation or malfunction is avoided, and high working accuracy/reliability and low production costs are achieved. Meanwhile, since the length of the second static and dynamic contact combination is longer than that of the first static and dynamic contact combination, it ensures that when the first static and dynamic contact combination and the second static and dynamic contact combination act simultaneously, the first inner swing arm pushes the first dynamic contact to open the first static and dynamic contact combination and the second inner swing arm pushes the second dynamic contact to close the second static and dynamic contact combination so as to finally disconnect the power supply of the auxiliary coil; therefore the momentary high current is prevented, the motor safety is largely improved, the potential safety hazard is eliminated and the motor lifespan is prolonged.

DETAILED DESCRIPTION OF THE EMBODIMENTS

Example 1

Figure 6:
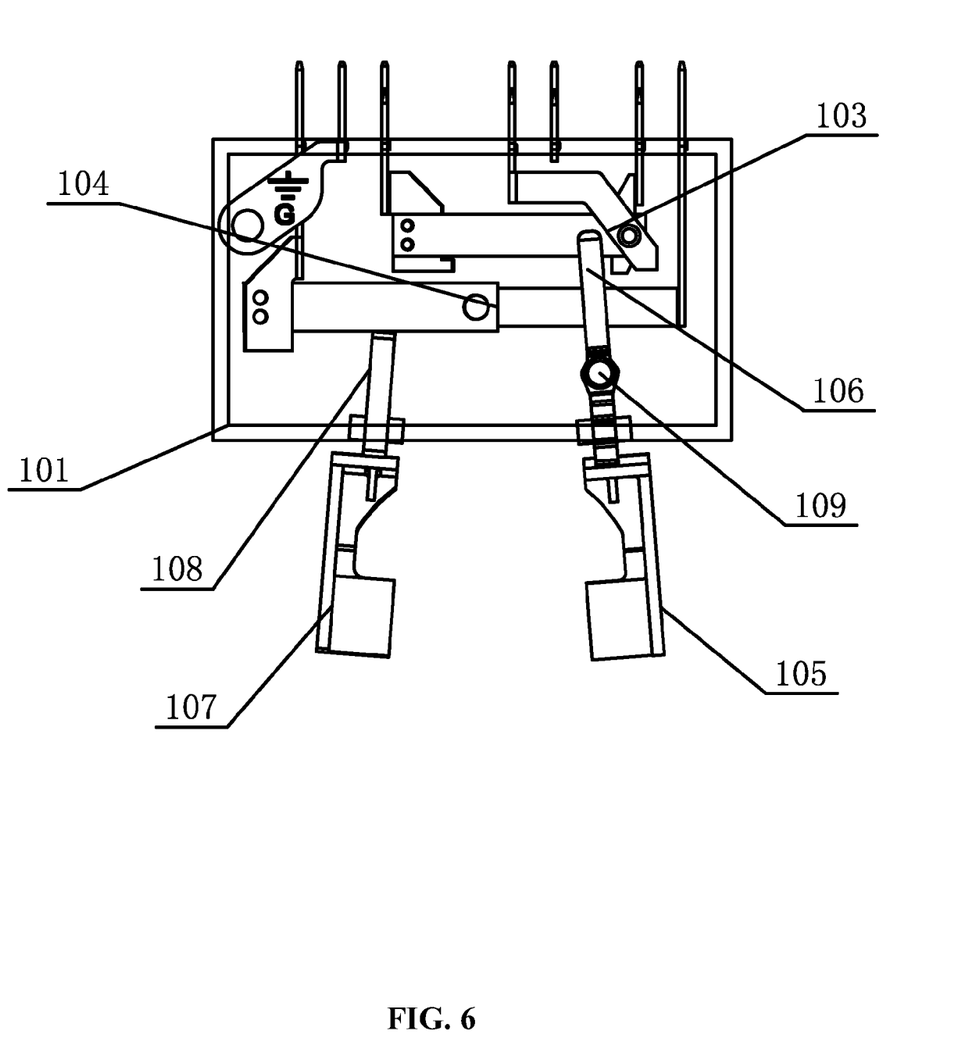
FIG. 6 is an internal structural representation of a centrifugal switch actuator in accordance with one embodiment of the invention.
Figure 7:
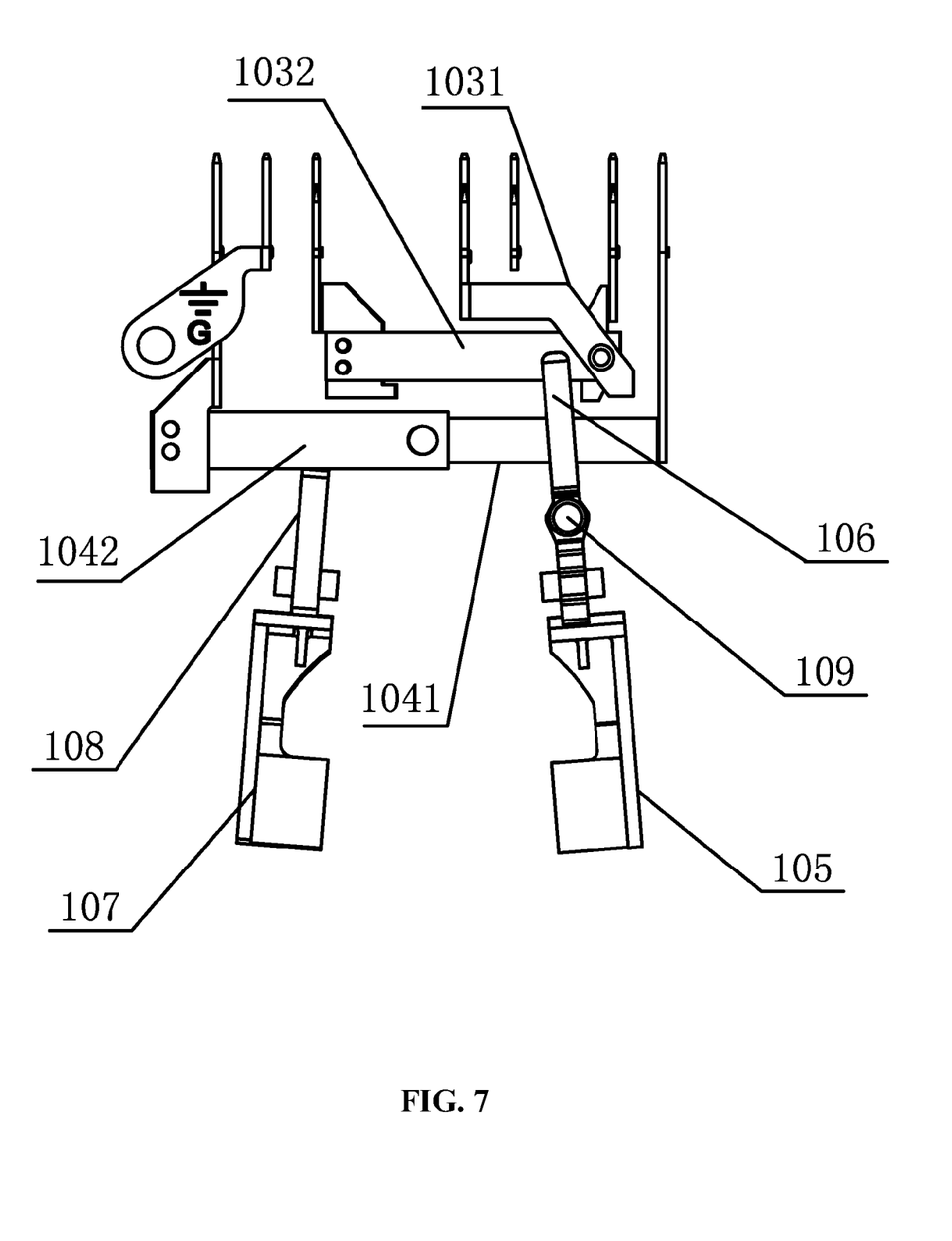
FIG. 7 is an internal partial structural representation of a centrifugal switch actuator in accordance with one embodiment of the invention.

As shown in FIGS. 6 and 7, a centrifugal switch actuator, in accordance with the invention, comprises a junction box 101, a cover, a first static and dynamic contact combination 103, a second static and dynamic contact combination 104, an outer swing arm, an inner swing arm, and a reset elastic element 109. The first static and dynamic contact combination 103, the second static and dynamic contact combination 104, and the reset elastic element 109 are located in the junction box 101, and the reset elastic element 109 enables the out swing arm and the inner swing arm to reset automatically. The outer swing arm comprises a first outer swing arm 105 and a second outer swing arm 107 and the inner swing arm comprises a first inner swing arm 106 and a second inner swing arm 108. The joint between the first outer swing arm 105 and the first inner swing arm 106 as well as the joint between the second outer swing arm 107 and the second inner swing arm 108 are hinged on the junction box 101, respectively. The first static and dynamic contact combination 103 and the second static and dynamic contact combination 104 are parallel with each other in two lines. The length ratio between the first static and dynamic contact combination 103 and the second static and dynamic contact combination 104 is 1:1.2. The first static and dynamic contact combination 103 comprises a first static contact 1031 and a first dynamic contact 1032 while the second static and dynamic contact combination 104 comprises a second static contact 1041 and a second dynamic contact 1042. The length ratio between the first static contact 1031 and the second static contact 1041 is 1:1.2, the length ratio between the first static contact 1031 and the first dynamic contact 1032 is 1:1.2, the length ratio between the second static contact 1041 and the second dynamic contact 1042 is 1:1, and the length ratio between the first inner swing arm 106 and the second inner swing arm 108 is 1:1.2.

Example 2

As shown in FIGS. 6 and 7, a centrifugal switch actuator has the same structure as that in Example 1 except that the length ratio between the first static and dynamic contact combination 103 and the second static and dynamic contact combination 104 is 1:1.5. The first static and dynamic contact combination 103 comprises a first static contact 1031 and a first dynamic contact 1032 and the second static and dynamic contact combination 104 comprises a second static contact 1041 and a second dynamic contact 1042. The length ratio between the first static contact 1031 and the second static contact 1041 is 1:1.5, the length ratio between the first static contact 1031 and the first dynamic contact 1032 is 1:1.5, the length ratio between the second static contact 1041 and the second dynamic contact 1042 is 1:1.2, and the length ratio between the first inner swing arm 106 and the second inner swing arm 108 is 1:1.5.

Example 3

As shown in FIGS. 6 and 7, a centrifugal switch actuator has the same structure as that in Example 1 except that the length ratio between the first static and dynamic contact combination 103 and the second static and dynamic contact combination 104 is 1:2. The first static and dynamic contact combination 103 comprises a first static contact 1031 and a first dynamic contact 1032 and the second static and dynamic contact combination 104 comprises a second static contact 1041 and a second dynamic contact 1042. The length ratio between the first static contact 1031 and the second static contact 1041 is 1:2, the length ratio between the first static contact 1031 and the first dynamic contact 1032 is 1:1.8, and the length ratio between the second static contact 1041 and the second dynamic contact 1042 is 1:1.3, and the length ratio between the first inner swing arm 106 and the second inner swing arm 108 is 1:2.

Example 4

As shown in FIGS. 6 and 7, a centrifugal switch actuator has the same structure as that in Example 1 except that the length ratio between the first static and dynamic contact combination 103 and the second static and dynamic contact combination 104 is 1:3. The first static and dynamic contact combination 103 comprises a first static contact 1031 and a first dynamic contact 1032 and the second static and dynamic contact combination 104 comprises a second static contact 1041 and a second dynamic contact 1042. The length ratio between the first static contact 1031 and the second static contact 1041 is 1:3, the length ratio between the first static contact 1031 and the first dynamic contact 1032 is 1:2, the length ratio between the second static contact 1041 and the second dynamic contact 1042 is 1:1.5, and the length ratio between the first inner swing arm 106 and the second inner swing arm 108 is 1:3.

Example 5

Figure 8:
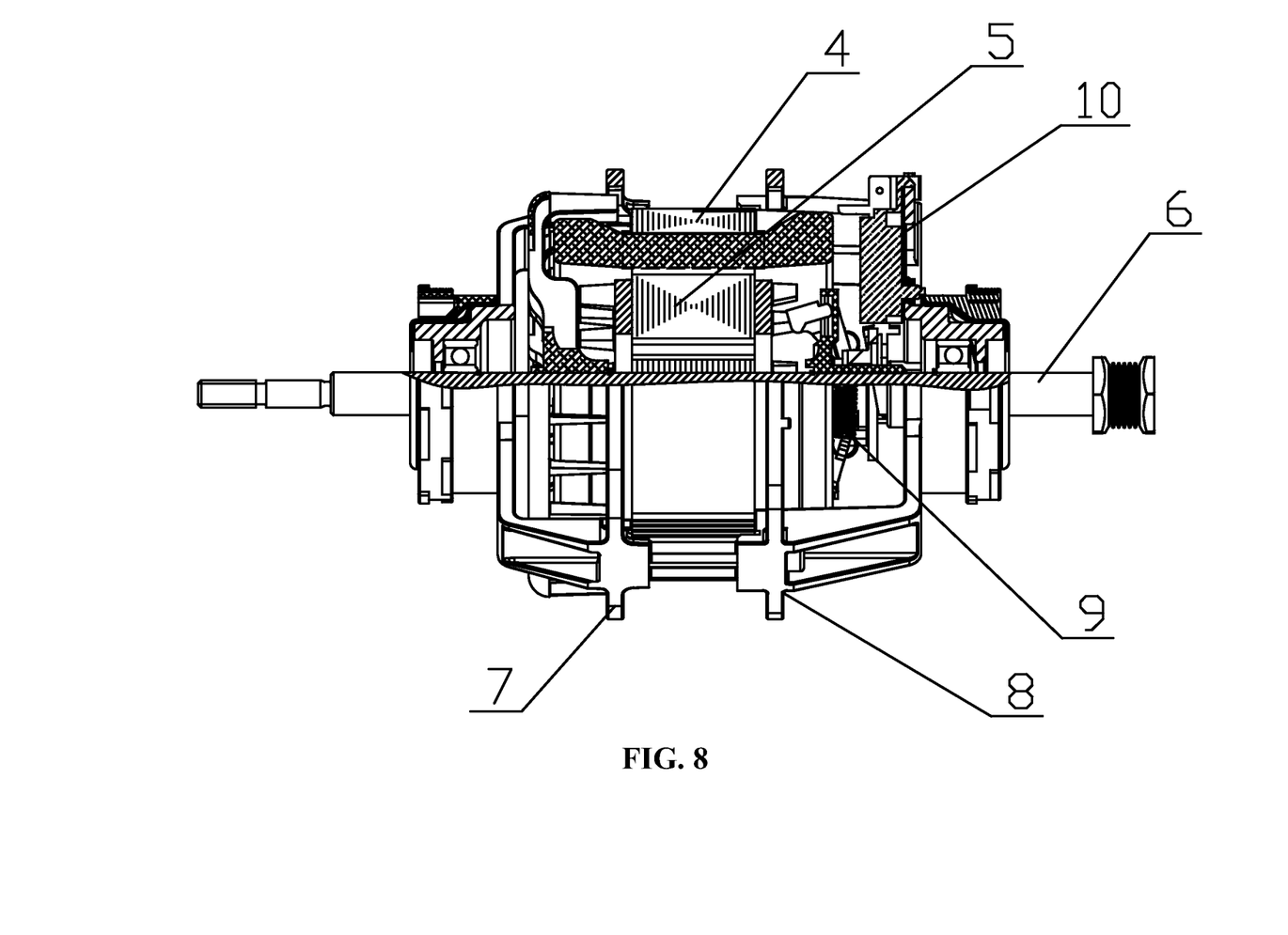
FIG. 8 is a half-sectional view of a motor using a centrifugal switch actuator of FIG. 6.

As shown in FIG. 8, a motor, in accordance with the invention, comprises a stator 4 wound with a primary coil 2 and an auxiliary coil 3, a rotor 5, a rotating shaft 6 integrated with the rotor 5, a front endshield 7, a rear endshield 8, and a centrifugal switch fixed on the rotating shaft. The front endshield 7 and the rear endshield 8 are connected together to form a cavity and the rotor 5 and the stator 4 are located in the cavity. The centrifugal switch comprises a centrifugal switch body 9 and a centrifugal switch actuator 10. The centrifugal switch actuator 10 comprises a junction box 101, a cover, a first static and dynamic contact combination 103, a second static and dynamic contact combination 104, an outer swing arm, an inner swing arm, and a reset elastic element 109. The first static and dynamic contact combination 103, the second static and dynamic contact combination 104, and the reset elastic element 109 are located in the junction box 101, the joint between the outer swing arm and the inner swing arm is hinged on the junction box 101, and the reset elastic element 109 enables the out swing arm and the inner swing arm to reset automatically. The outer swing arm comprises a first outer swing arm 105 and a second outer swing arm 107 and the inner swing arm comprises a first inner swing arm 106 and a second inner swing arm 108. The joint between the first outer swing arm 105 and the first inner swing arm 106 as well as the joint between the second outer swing arm 107 and the second inner swing arm 108 are hinged on the junction box 101, respectively. The first static and dynamic contact combination 103 and the second static and dynamic contact combination 104 are parallel with each other in two lines. The length ratio between the first static and dynamic contact combination 103 and the second static and dynamic contact combination 104 is 1:1.2. The first static and dynamic contact combination 103 comprises a first static contact 1031 and a first dynamic contact 1032 while the second static and dynamic contact combination 104 comprises a second static contact 1041 and a second dynamic contact 1042. The length ratio between the first static contact 1031 and the second static contact 1041 is 1:1.2, the length ratio between the first static contact 1031 and the first dynamic contact 1032 is 1:1.2, and the length ratio between the second static contact 1041 and the second dynamic contact 1042 is 1:1. The rest parameters in this example are the same as those described in Examples 1 or 2 or 3 or 4.

Figure 1:
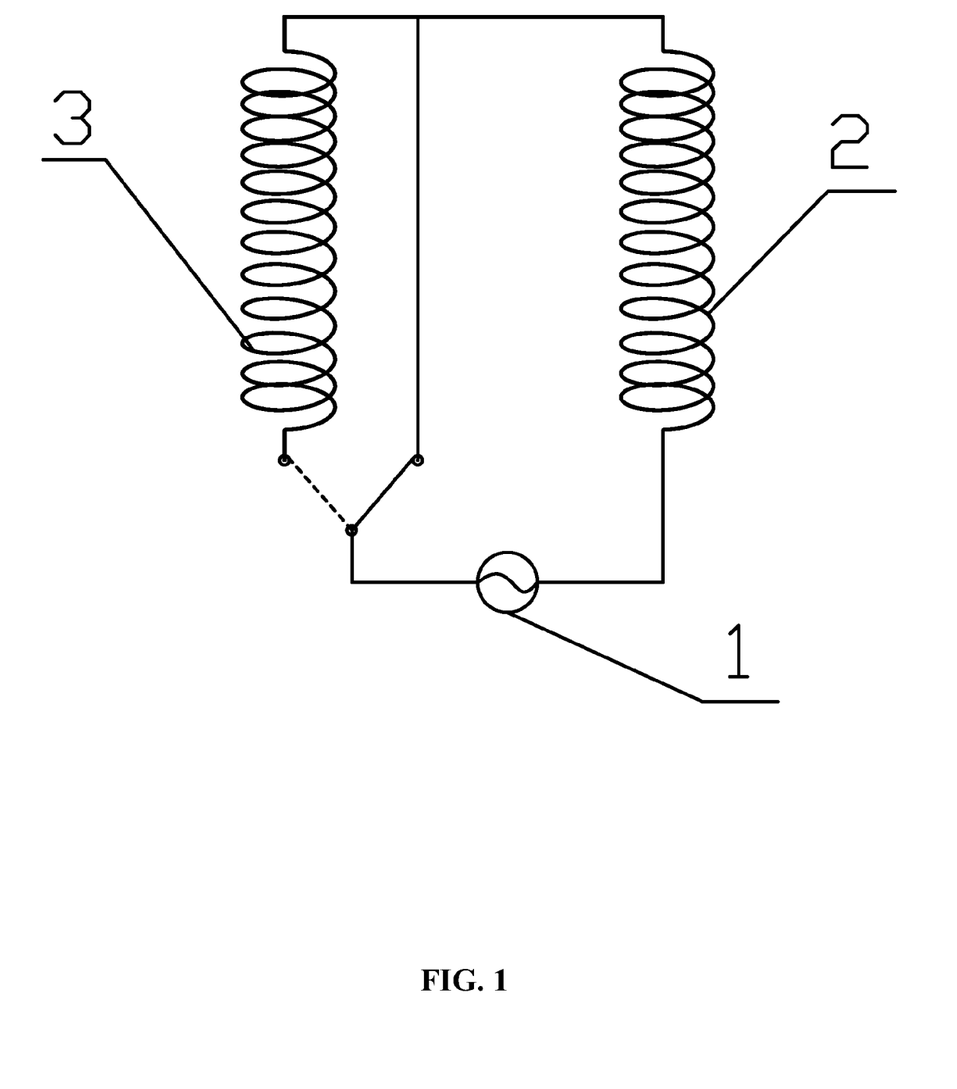
FIG. 1 is a drive circuit diagram of a motor with a centrifugal switch.

The working principle of the motor given in example 5 is explained below with reference to FIG. 1: under normal circumstances, the rotor 5 runs at a permissible speed, the slide plate of the centrifugal switch body 9 is against both the first outer swing arm 105 and the second outer swing arm 107, and both the primary coil 2 and the auxiliary coil 3 are connected with an AC power supply 1 and electrified simultaneously. When the rotor 5 runs beyond the permissible speed, i.e. 70-80% of the startup speed, the centrifugal block of the centrifugal switch body 9 overcomes the spring resistance to expand outwards to allow the slide plate to move. The first outer swing arm 105 and the second outer swing arm 107 then lose the acting force imposed by the slide plate and the reset elastic element 109 enables the outer swing arm and the inner swing arm to reset automatically. The first inner swing arm 106 pushes the first dynamic contact 1032 to open the first static and dynamic contact combination 103 so as to finally disconnect the auxiliary coil 3 from the AC power supply 1, and the second inner swing arm 108 pushes the second dynamic contact 1042 to close the second static and dynamic contact combination 104 so as to finally connect the heating elements with the AC power supply 1.

Example 6

As shown in FIG. 8, a motor, in accordance with the invention, has the same structure as that in Example 5 except that the length ratio between the first static and dynamic contact combination 103 and the second static and dynamic contact combination 104 is 1:1.5. The first static and dynamic contact combination 103 comprises a first static contact 1031 and a first dynamic contact 1032 and the second static and dynamic contact combination 104 comprises a second static contact 1041 and a second dynamic contact 1042. The length ratio between the first static contact 1031 and the second static contact 1041 is 1:1.5, the length ratio between the first static contact 1031 and the first dynamic contact 1032 is 1:1.5, and the length ratio between the second static contact 1041 and the second dynamic contact 1042 is 1:1.2. The rest parameters in this example are the same as those described in Examples 5.

Example 7

As shown in FIG. 8, a motor, in accordance with the invention, has the same structure as that in Example 5 except that the length ratio between the first static and dynamic contact combination 103 and the second static and dynamic contact combination 104 is 1:2. The first static and dynamic contact combination 103 comprises a first static contact 1031 and a first dynamic contact 1032 while the second static and dynamic contact combination 104 comprises a second static contact 1041 and a second dynamic contact 1042. The length ratio between the first static contact 1031 and the second static contact 1041 is 1:2, the length ratio between the first static contact 1031 and the first dynamic contact 1032 is 1:1.5, and the length ratio between the second static contact 1041 and the second dynamic contact 1042 is 1:1.3. The rest parameters in this example are the same as those described in Example 5.

Example 8

As shown in FIG. 8, a motor, in accordance with the invention, has the same structure as that in Example 5 except that the length ratio between the first static and dynamic contact combination 103 and the second static and dynamic contact combination 104 is 1:3. The first static and dynamic contact combination 103 comprises a first static contact 1031 and a first dynamic contact 1032 while the second static and dynamic contact combination 104 comprises a second static contact 1041 and a second dynamic contact 1042. The length ratio between the first static contact 1031 and the second static contact 1041 is 1:3, the length ratio between the first static contact 1031 and the first dynamic contact 1032 is 1:2, and the length ratio between the second static contact 1041 and the second dynamic contact 1042 is 1:1.5. The rest parameters in this example are the same as those described in Example 5.

Example 9

Figure 9:
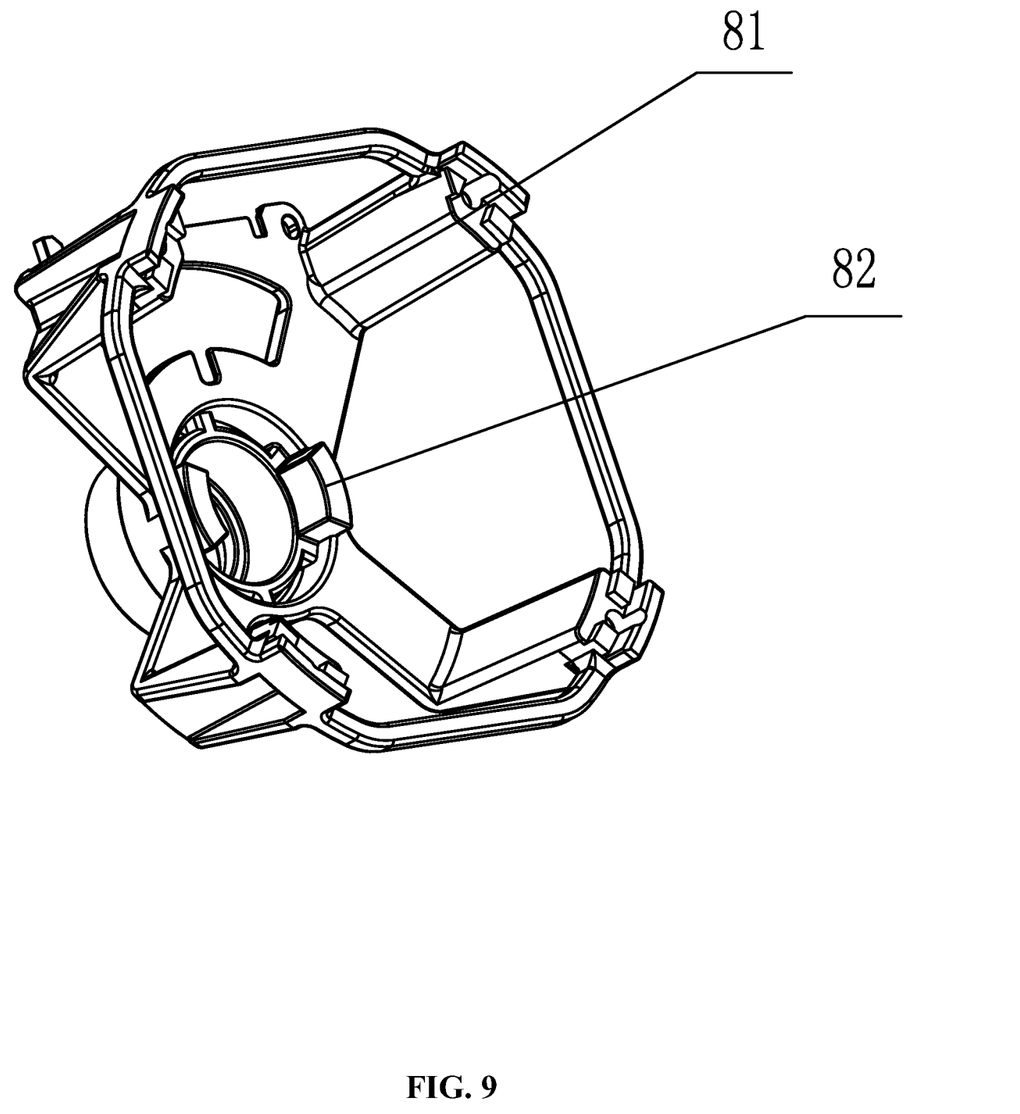
FIG. 9 is a structural representation of a rear endshield of a motor using a centrifugal switch actuator of FIG. 6.

As shown in FIG. 9, a motor, in accordance with the invention, comprises a rear endshield 8. The rear endshield 8 comprises a rear endshield body 81, on which a boss 82 is disposed. The rest parameters in this example are the same as those described in Examples 5 or 6 or 7 or 8.

Example 10

A motor, in accordance with the invention, has the same structure as that in Example 9 except that the boss 82 and the rear endshield body 81 are molded together by cast aluminum.

Example 11

A motor, in accordance with the invention, has the same structure as that in Example 9 or 10 except that the boss 82 is in the shape of a square.

Example 12

A motor, in accordance with the invention, has the same structure as that in Example 9 or 10 except that the boss 82 is in the shape of a circle.

Example 13

A motor, in accordance with the invention, has the same structure as that in Example 9 or 10 except that the boss 82 is in the shape of an oval.

Example 14

A motor, in accordance with the invention, has the same structure as that in Example 9 or 10 except that the boss 82 is in the shape of an arc.

Example 15

A motor, in accordance with the invention, has the same structure as that in Example 9 or 10 except that the boss 82 is in the shape of a polygon.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A centrifugal switch actuator, comprising:
a) a junction box;
b) a cover;
c) a first static and dynamic contact combination;
d) a second static and dynamic contact combination;
e) an outer swing arm;
f) an inner swing arm; and
g) a reset elastic element;
wherein
the first static and dynamic contact combination, the second static and dynamic contact combination, and the reset elastic element are located in the junction box;
a joint between the outer swing arm and the inner swing arm is hinged on the junction box;
the reset elastic element enables the out swing arm and the inner swing arm to reset automatically;
the outer swing arm comprises a first outer swing arm and a second outer swing arm;
the inner swing arm comprises a first inner swing arm and a second inner swing arm;

a joint between the first outer swing arm and the first inner swing arm as well as a joint between the second outer swing arm and the second inner swing arm are hinged on the junction box, respectively; and the length of the first static and dynamic contact combination is different from that of the second static and dynamic contact combination.

2. The centrifugal switch actuator of claim 1, wherein the first static and dynamic contact combination and the second static and dynamic contact combination are parallel with each other in two lines and the length of the first static and dynamic contact combination is smaller than that of the second static and dynamic contact combination.

3. The centrifugal switch actuator of claim 2, wherein the length ratio between the first static and dynamic contact combination and the second static and dynamic contact combination is within the range of 1:1.2-1:3.

4. The centrifugal switch actuator of claim 3, wherein
the first static and dynamic contact combination comprises a first static contact and a first dynamic contact;
the second static and dynamic contact combination comprises a second static contact and a second dynamic contact; and
the length of the first static contact is different from that of the second static contact.

5. The centrifugal switch actuator of claim 4, wherein the length ratio between the first static contact and the second static contact is within the range of 1:1.2-1:3.

6. The centrifugal switch actuator of claim 4, wherein the length ratio between the first static contact and the first dynamic contact is within the range of 1:1.2-1:2 and the length ratio between the second static contact and the second dynamic contact is within the range of 1:1-1:1.5.

7. The centrifugal switch actuator of claim 4, wherein the length ratio between the first inner swing arm and the second inner swing arm is within the range of 1:1.2-1:3.

8. The centrifugal switch actuator of claim 2, wherein
the first static and dynamic contact combination comprises a first static contact and a first dynamic contact;
the second static and dynamic contact combination comprises a second static contact and a second dynamic contact; and
the length of the first static contact is different from that of the second static contact.

9. The centrifugal switch actuator of claim 8, wherein the length ratio between the first static contact and the second static contact is within the range of 1:1.2-1:3.

10. The centrifugal switch actuator of claim 8, wherein the length ratio between the first static contact and the first dynamic contact is within the range of 1:2-1:2 and the length ratio between the second static contact and the second dynamic contact is within the range of 1:1-1:1.5.

11. The centrifugal switch actuator of claim 8, wherein the length ratio between the first inner swing arm and the second inner swing arm is within the range of 1:1.2-1:3.

12. The centrifugal switch actuator of claim 1, wherein
the first static and dynamic contact combination comprises a first static contact and a first dynamic contact;
the second static and dynamic contact combination comprises a second static contact and a second dynamic contact; and
the length of the first static contact is different from that of the second static contact.

13. The centrifugal switch actuator of claim 12, wherein the length ratio between the first static contact and the second static contact is within the range of 1:1.2-1:3.

14. The centrifugal switch actuator of claim 12, wherein the length ratio between the first static contact and the first dynamic contact is within the range of 1:1.2-1:2 and the length ratio between the second static contact and the second dynamic contact is within the range of 1:1-1:1.5.

15. The centrifugal switch actuator of claim 12, wherein the length ratio between the first inner swing arm and the second inner swing arm is within the range of 1:1.2-1:3.

16. A motor, comprising:
a) a stator with a primary coil and an auxiliary coil;
b) a rotor;
c) a rotating shaft integrated with the rotor;
d) a front endshield;
e) a rear endshield; and
f) a centrifugal switch fixed on the rotating shaft;
wherein
the front endshield and the rear endshield are connected together to form a cavity and the stator and the rotor are located in the cavity;
the centrifugal switch comprises a centrifugal switch body and a centrifugal switch actuator;
the centrifugal switch actuator comprises a junction box, a cover, a first static and dynamic contact combination, a second static and dynamic contact combination, an outer swing arm, an inner swing arm, and a reset elastic element;
the first static and dynamic contact combination, the second static and dynamic contact combination, and the reset elastic element are located in the junction box;
a joint between the outer swing arm and the inner swing arm is hinged on the junction box;
the reset elastic element enables the out swing arm and the inner swing arm to reset automatically;
the outer swing arm comprises a first outer swing arm and a second outer swing arm and the inner swing arm comprises a first inner swing arm and a second inner swing arm;
a joint between the first outer swing arm and the first inner swing arm as well as a joint between the second outer swing arm and the second inner swing arm are hinged on the junction box, respectively; and
the length ratio between the first static and dynamic contact combination and the second static and dynamic contact combination is within the range of 1:1.2-1:3.

17. The motor of claim 16, wherein
the first static and dynamic contact combination comprises a first static contact and a first dynamic contact;
the second static and dynamic contact combination comprises a second static contact and a second dynamic contact; and
the length ratio between the first static contact and the second static contact is within the range of 1:1.2-1:3.

18. The motor of claim 16, wherein the length ratio between the first static contact and the first dynamic contact is within the range of 1:1.2-1:2 and the length ratio between the second static contact and the second dynamic contact is within the range of 1:1-1:1.5.

19. The motor of claim 16, wherein the rear endshield comprises a rear endshield body, on which a boss is disposed.

20. The motor of claim 19, wherein
the boss and the rear endshield body are molded together by cast aluminum; and
the boss is in the shape of a square, a circle, an oval, an arc, or a polygon.

* * * * *